United States Patent
Fersht

[11] Patent Number: 6,141,474
[45] Date of Patent: Oct. 31, 2000

[54] REINFORCEMENT OF FIBER OPTIC GYROSCOPE COILS

[75] Inventor: Samuel N. Fersht, Studio City, Calif.

[73] Assignee: Litton Systems, Inc., Woodland Hills, Calif.

[21] Appl. No.: 09/118,229

[22] Filed: Jul. 17, 1998

Related U.S. Application Data

[60] Provisional application No. 60/053,152, Jul. 18, 1997.

[51] Int. Cl.[7] .................................................. G02B 6/02
[52] U.S. Cl. ............................................................. 385/123
[58] Field of Search .................................. 385/121–123, 385/147

[56] References Cited

U.S. PATENT DOCUMENTS 5,546,482  8/1996  Cordova et al. ........................... 385/12

FOREIGN PATENT DOCUMENTS 63-134913  10/1988  Japan ........................................ 385/123
7-144836  10/1995  Japan .

*Primary Examiner*—Akm E. Ullah
*Attorney, Agent, or Firm*—Lewis B. Sternfels

[57] ABSTRACT

To minimize the uncompensated part of the Shupe error, a one or more continuous coils (28, 44, 46) thermally stable material is added to a composite coil assembly (20) to dominate the composite in terms of thermal expansion and elastic modulus. The thermally stable material includes a plurality of continuously coiled fibers (28, 44, 46) selected from a material group which possesses a high modulus and a low coefficient of thermal expansion. The preferred fiber is formed from a carbon-graphite material which is selectively wound within the optical fibers (22) in the coil assembly and/or is wound about the interior and exterior circumferences of the coil assembly.

21 Claims, 2 Drawing Sheets

REINFORCEMENT OF FIBER OPTIC GYROSCOPE COILS

CROSS-REFERENCE TO RELATED APPLICATION

This application claims the benefit of U.S. Provisional application Ser. No. 60/053,152, filed Jul. 18, 1997.

FIELD OF THE INVENTION

The present invention relates to fiber optic gyroscopes and, more is particularly, to means and methods for counteracting time-dependent temperature gradients along the optical fiber.

DESCRIPTION OF RELATED ART AND OTHER CONSIDERATIONS

Conventional fiber optic gyroscope coils (FOG) are composites of bonded or dry wound materials that largely possess erratic temperature dependent mechanical properties. This behavior of the composite coil over temperature is not desired, and results in nonreciprocity of light simultaneously traversing in opposite directions in the coil. This effect, known as the extended Shupe bias error, is noncancelling and involves free thermal expansion, thermal stress expansion, stress free refractive index dependence on temperature, and thermal strain photo elastic variations of the refractive index. Reference is made to two articles entitled "Thermally Induced Nonreciprocity in the Fiberoptic Interferometer" by D. M. Shupe, Applied Optics, Vol. 19, No. 5, Mar. 1, 1980 and "Compensation of Linear Sources of Non-Reciprocity in Sagnac Interferometers" by Nicholas J. Frigo, Fiber Optic and Laser Sensors I, Proc. 1 SPIE, Vol. 412, 268–271 (1983).

Specifically, under ideal temperature conditions and without rotation of the coil about its axis, the two paths, through which the clockwise and counter-clockwise light traverse the coil, would be of equal length and, therefore, there would be no phase change. With rotation, a net phase change is produced, because of the difference in time that the clockwise and counter-clockwise light traverse their paths, and the change in phase is an accurate reflection of the speed of rotation. This proportionality to the rate of rotation is known as the Sagnac effect.

However, should the path lengths change due to other causes, accuracy suffers. Such change is caused by stress exerted upon the coil and its optical fiber, specifically produced by temperature variations in the fibers. Such changes in the path lengths result from both transient temperature changes alone and a combination of transient temperature changes over different parts of the fiber. The problem is exacerbated at cooler rather than hotter temperatures, e.g., towards −50° C. where the fiber can become brittle and fracture. At such temperatures, the fiber can also break away from its bonding with carbon.

SUMMARY OF THE INVENTION

These and other problems and concerns are successfully addressed and overcome by the present invention. Briefly, to minimize the uncompensated part of the Shupe error, a thermally stable material is added to a composite coil structure comprising the fiber optic fiber coil and the continuous fiber coil of thermally stable material in which the continuous coils dominate the composite in terms of thermal expansion and elastic modulus. The thermally stable material includes a plurality of coiled fibers selected from a material group which possesses a high modulus and a low coefficient of thermal expansion. The preferred fiber material is formed from a carbongraphite material which and this continuous coil is selectively wound within the optical fibers optical fiber coil and/or is wound about the interior and exterior circumferences of the coil.

Several advantages are derived from the above construction. Changes in the optical path lengths of the optical fibers is avoided, to minimize the uncompensated part of the Shupe error. Strains and stresses of the optical fibers is avoided upon changes in temperature.

Other aims and advantages, as well as a more complete understanding of the present invention, will appear from the following explanation of an exemplary embodiment and the accompanying drawings thereof.

DETAILED DESCRIPTION

Figure 1:
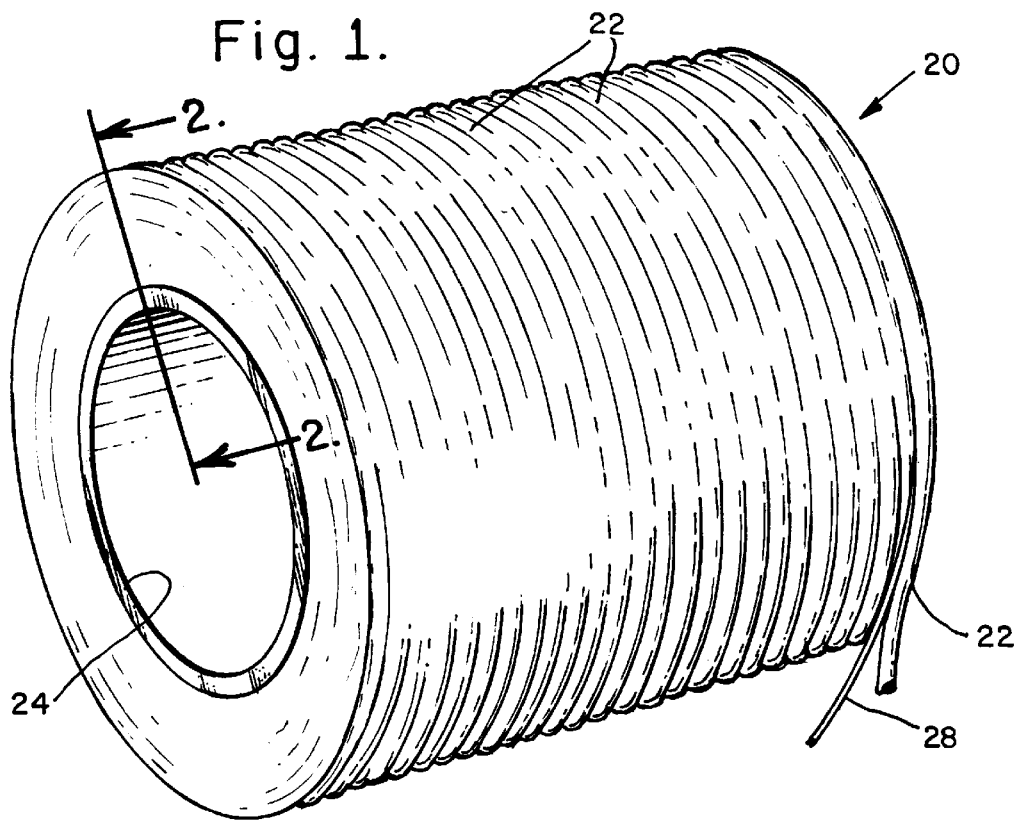
FIG. 1 is a prospective view of a first embodiment of the present invention comprising a reinforced fiber optic gyroscope coil assembly in which a plurality of coiled thermally stable fibers are interspersed between some or all winding portions of the optical fiber.
Figure 2:
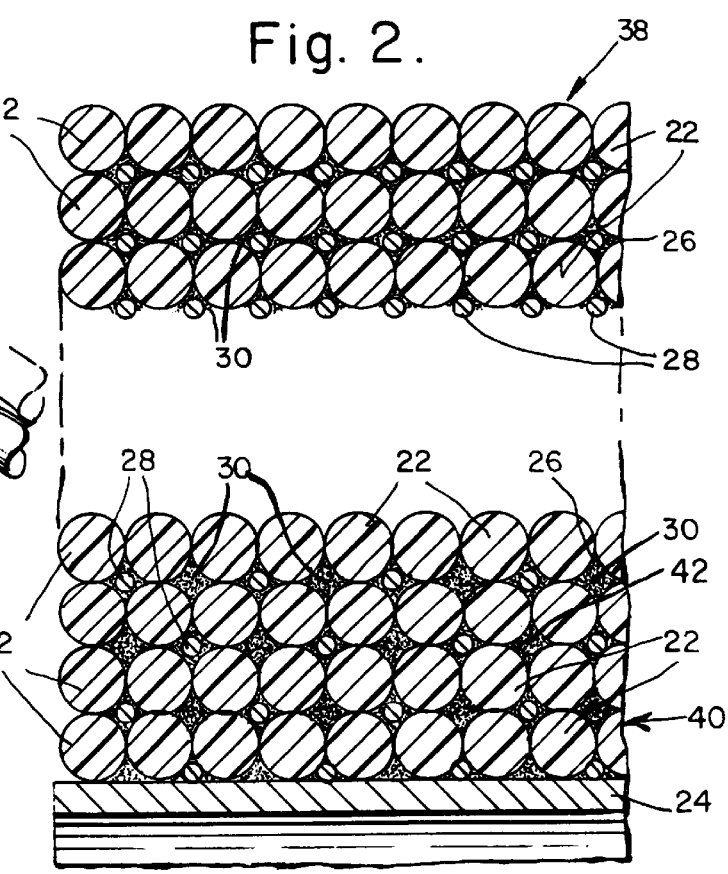
FIG. 2 is a cross-sectional view of the embodiment shown in FIG. 1, taken along line 2—2 thereof.

Referring to FIGS. 1 and 2, a reinforced fiber optic gyroscope coil assembly 20, which is an element of subassembly in a fiber optic gyroscope, comprises an optical fiber 22 wound on a spool 24 to form a fiber optic coil coil. The winding of the optical fiber coil is conventional. Placed in interstices 26 formed between windings of optical fiber 22 is thermally stable material in coiled form 28 preferably shaped as one or more coils of such material. Bonding material 30 is also added to secure the ensemble together and, thus, to ensure that the placement of the several coils remain securely placed in position. The material of fiber coil 28 is added to the composite coil to dominate the composite in terms of thermal expansion and elastic modulus.

As stated above, the thermally stable material in coil 28 includes a plurality of coiled continuous fibers selected from a material group which possesses a high modulus and a low coefficient of thermal expansion. The preferred continuous fiber coiled is formed from a carbon-graphite material which is selectively wound within the optical fibers in the coil and/or is wound about the interior and exterior circumferences of the coil. Such a carbon-graphite fiber or strands of similar material, when constructed as a belt, forms a reinforcement having a low coefficient of thermal expansion.

Figure 3:
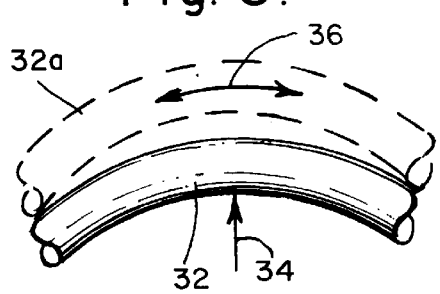
FIG. 3 is representative view of a segment of an optical fiber shown in full depicting it in an unstressed condition prior to being subjected to thermal expansion and in dashed lines depicting it in an stressed condition after being subjected to thermal expansion.

As further understanding of the function of fiber material 28, reference is directed to FIG. 3. An optical fiber segment 32, which is illustrative as forming a representative segment of one or many segments located variously along optical fiber 22, is shown in full line when not placed under stress. However, when a radially exerted force, as illustrated by arrow 34, is exerted against fiber segment 32, it tends to become elongated, as shown in dashed lines as fiber 32a, and causes the fiber segment to be placed under tension, as denoted by double-headed arrow 36. The radially-directed force 34 is caused by an increase in temperature. Such elongation, or several elongations located variously along fiber 22, deleteriously affects the light-carrying properties of the fiber, such as nonreciprocity of light simultaneously traversing in opposite directions in the coil. This effect, known as the extended Shupe bias error, is noncancelling and involves free thermal expansion, thermal stress expansion, stress free refractive index dependence on temperature, and thermal strain photo elastic variations of the refractive index. If the tension itself, as distinguished from elongation(s) of fiber 22 and its optical path, becomes too great, especially at cold temperatures, e.g., −50° C., the fiber may even break. Therefore, it is an important feature of the present invention to prevent such thermally caused expansion to occur, which is resisted by the use of thermally stable material embodied in one or more continuous coils.

Because these tension-creating forces increase towards the outer portions (denoted by indicium 38 in FIG. 2) of coil assembly 20, when more than one continuous coil is used fewer thermally stable continuous fibers of the continuous coils 28 are needed at inner portions of coil assembly 20 (denoted by indicium 40), and more are needed at the outer portions 38 of the coil assembly. Therefore, some interstices in inner portion 40 remain empty, as depicted by indicium 42.

Figure 4:
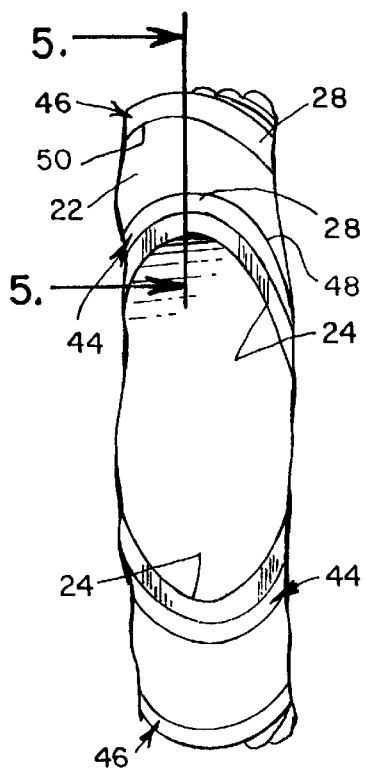
FIG. 4 is a view of a second embodiment of the present invention comprising a reinforced fiber optic gyroscope coil assembly in which plurality of coiled thermally stable fibers are radially positioned against the inner and outer circumferences of the optical fiber coil.
Figure 5:
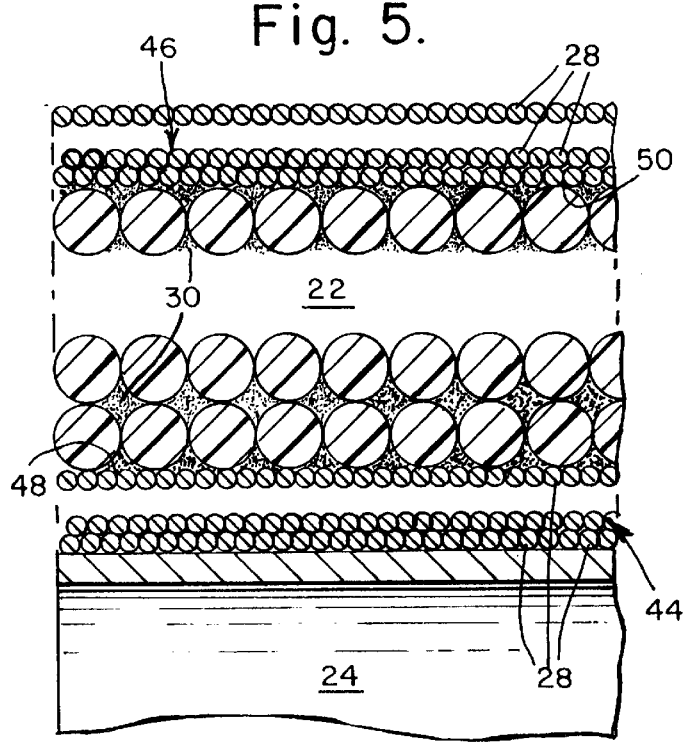
FIG. 5 is a cross-sectional view of the embodiment shown in FIG. 4, taken along line 5—5 thereof.

Another embodiment of the present invention is depicted in FIGS. 4 and 5. Here, rather than placing continuous coils thermally stable reinforcing fibers in the interstices between the optical fiber windings, a plurality of toroidally-shaped thermally stable reinforcing fiber windings or continuous coils 44 and 46 are secured at the respective inner and outer circumferences (respectively denoted by indicia 48 and 50) of optical fiber coil assembly 20.

Figure 6:
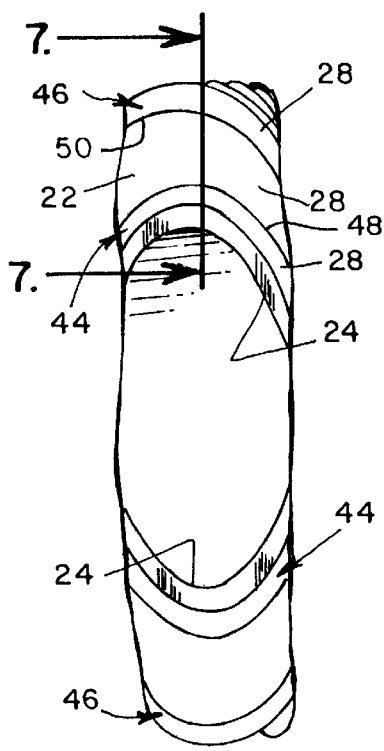
FIG. 6 is a view of a combination of the first and second embodiments illustrated in FIGS. 2 and 5, as incorporated in a single coil composite.
Figure 7:
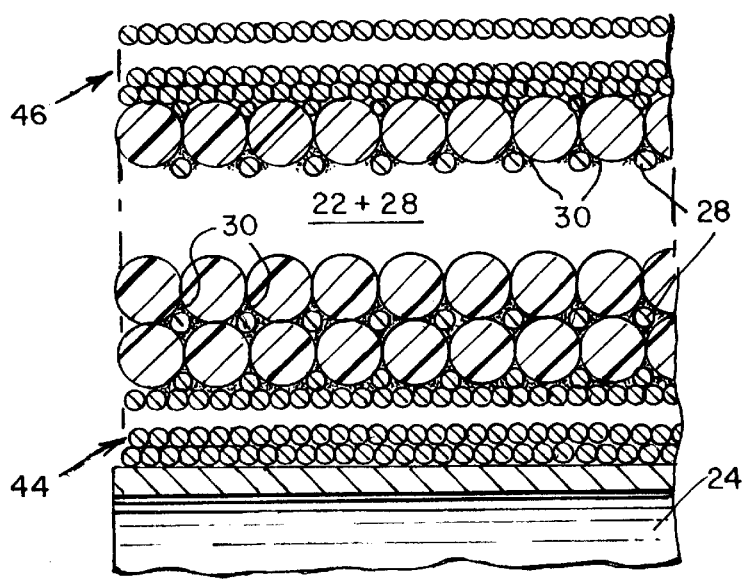
FIG. 7 is a cross-sectional view of the embodiment shown in FIG. 6, taken along line 7—7 thereof.

If the need is great, the two embodiments previously illustrated and described above may be combined, as shown in FIGS. 6 and 7. Here, interstitial three continuous coils of thermally stable reinforcing fibers 28 and of toroidally-shaped thermally stable reinforcing fibers 44 and 46 are secured respectively in between optical fibers 22 and 24 and about their inner and outer circumferences 48 and 50.

Although the invention has been described with respect to particular embodiments thereof, it should be realized that various changes and modifications may be made therein without departing from the spirit and scope of the invention.

What is claimed is:

1. A reinforced fiber optic coil assembly comprising:
a fiber optic coil; and
means defining at least one continuous coil of thermally stable material added to said fiber optic coil to form therewith a composite coiled structure in which said continuous coil means dominates said composite coiled structure vis-a-vis said fiber optic coil in terms of thermal expansion and elastic modulus.

2. A reinforced fiber optic coil assembly according to claim 1 in which said continuous coil means of thermally stable material comprises a plurality of reinforcing fibers selected from a material group which possesses a high modulus and a low coefficient of thermal expansion.

3. A reinforced fiber optic coil assembly according to claim 2 further including bonding material bonding both said optic fiber coil and said, continuous coil means together.

4. A reinforced fiber optic coil assembly according to claim 2 in which said continuous coil of thermally stable material comprises a carbon-graphite material.

5. A reinforced fiber optic coil assembly according to claim 4 further including bonding material bonding said composite coiled structure together.

6. A reinforced fiber optic coil assembly according to claim 3 in which continuous coil means selectively wound within in said fiber optic coil.

7. A reinforced fiber optic coil assembly according to claim 2 in which said continuous coil means comprises a pair of continuous coils wound about the interior and exterior circumferences of said fiber optic coil.

8. A reinforced fiber optic coil assembly according to claim 2 in which said continuous coil means comprises continuous coils respectively and selectively wound within said fiber optic coil and about the interior and exterior circumferences of said fiber optic coil.

9. A reinforced fiber optic gyroscopic coil assembly for minimizing Shupe error, comprising:
a fiber optic coil; and
means defining at least one continuous coil of thermally stable material added to said fiber optic coil to form therewith a composite, coiled structure in which said continuous coil means dominates said composite coiled structure vis-a-vis said fiber optic coil in terms of thermal expansion and elastic modulus, thereby to minimize the uncompensated part of the Shupe error.

10. A reinforced fiber optic gyroscopic coil assembly according to claim 9 in which said continuous coil means thermally stable material comprises a plurality of reinforcing fibers selected from a material group which possesses a high modulus and a low coefficient of thermal expansion.

11. A reinforced fiber optic gyroscopic coil assembly according to claim 10 further including bonding material bonding said composite coiled structure together.

12. A reinforced fiber optic gyroscopic coil assembly according to claim 10 in which continuous coil means of thermally stable material comprises a carbon-graphite material.

13. A reinforced fiber optic gyroscopic coil assembly according to claim 12 further including bonding material bonding said composite coiled structure together.

14. A reinforced fiber optic gyroscopic coil assembler according to claim 10 in which continuous coil means is selectively wound within said fiber optic coil.

15. A reinforced fiber optic gyroscopic coil assembler according to claim 10 in which said continuous coil means comprises a pair off continuous coils selectively wound said fiber optic coil.

16. A reinforced fiber optic gyroscopic coil assembly according to claim 10 in which continuous coil means comprises a pair of continuous coils wound about the interior and exterior circumferences of said fiber optic coil.

17. A reinforced fiber optic gyroscopic coil assembly according to claim 10 in which continuous coil means comprises continuous coils selectively wound within said fiber optic coil and about the interior and exterior circumferences of said fiber optic coil.

18. A method for reinforcing a fiber optic gyroscopic coil assembly for minimizing Shupe error, comprising the step of:

means defining at least one continuous coil of thermally stable material added to said fiber optic coil to form therewith a composite coiled structure in which said continuous coil means dominates said composite coiled structure vis-a-vis said fiber optic coil in terms of thermal expansion and elastic modulus, thereby to minimize the uncompensated part of the Shupe error.

19. A method according to claim 18 wherein said adding step further comprises the step of placing the continuous coil means of thermally stable material within interstices between elements of the fiber optic coil.

20. A method according to claim 18 wherein said adding step further comprises the step of placing the continuous coil means of the thermally stable material about the interior and exterior circumferences of the fiber optic coil.

21. A method according to claim 18 wherein said adding step further comprises the steps of placing the continuous coil means of the thermally stable material within interstices between elements of the fiber optic coil and about the interior and exterior circumferences of the fiber optic coil.

* * * * *